J. LIBLONG.
Domestic Boiler.
No. 15,633. Patented Aug. 26, 1856.
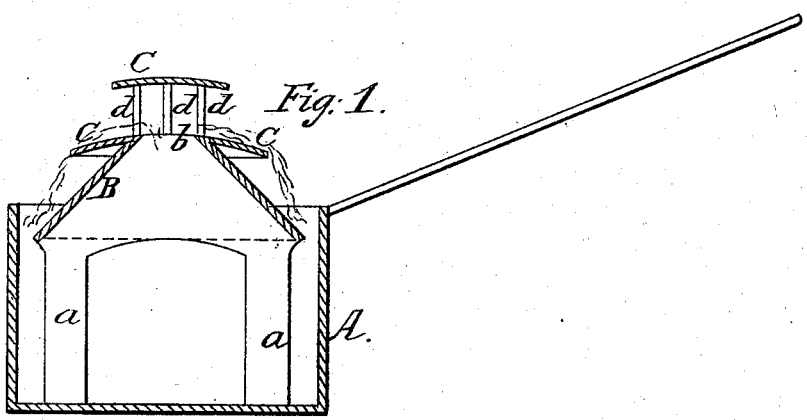
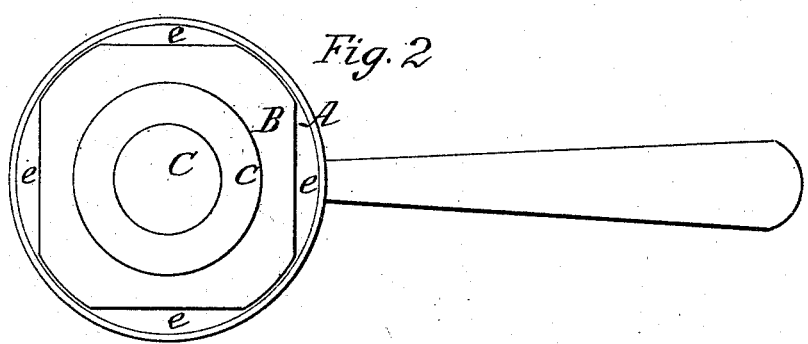

UNITED STATES PATENT OFFICE.

JOHN LIBLONG, OF WATERBURY, CONNECTICUT, ASSIGNOR TO EDWARD BROWN AND JAS. R. CASE, OF SAME PLACE.

DEVICE FOR PREVENTING LIQUIDS FROM BOILING OVER THE SIDES OF VESSELS.

Specification of Letters Patent No. 15,633, dated August 26, 1856.

*To all whom it may concern:*

Be it known that I, JOHN LIBLONG, of Waterbury, in the county of New Haven and State of Connecticut, have invented a new and useful Device to be Applied to Vessels for Preventing Liquids from Boiling Over the Sides Thereof; and I do hereby declare that the following is a full, clear, and exact description of the same, reference being had to the annexed drawings, making a part of this specification, in which—

Figure 1, is a vertical section of a stew pan with my improvement applied to it. Fig. 2, is a plan or top view of ditto.

My invention consists in placing a conical shaped cap within the vessel, said cap having an opening at its apex over which opening a deflecting plate is placed, the whole being so arranged that the boiling liquid will pass up through the opening in the apex of the cap and striking against the deflecting plate will pass down again into the vessel so that the liquid is effectually prevented from passing over the sides of the vessel.

To enable those skilled in the art to fully understand and construct my invention, I will proceed to describe it.

A, represents an ordinary stew pan, and B, is a conical cap the lower edge of which has vertical strips (*a*), attached to it to serve as supports, said strips being sufficiently long so that the lower edge of the cap will be but a short distance below the top of the stew pan, the cap being placed within the stew pan, the strips (*a*), resting on its bottom as shown in Fig. 1.

The top or apex of the cap B, extends a short distance above the upper edge of the stew pan and has an opening (*b*), made through it the opening being surrounded by a flanch (*c*).

C, represents a deflecting plate which is of circular form and its under surface made slightly concave. This plate is supported a short distance above the opening (*b*), and directly over it by rods (*d*).

From the above description it will be seen that when the liquid in the stew pan rises it will pass through the opening (*b*), in the top of the cap B, and will fall down on the outer side of the cap and pass again into the stew pan through spaces (*e*), between the lower edge of the cap and the stew pan, see Fig. 2. If the liquid rises rapidly the deflecting plate C, directs it downward as the liquid will strike against it. The flanch (*c*), directs the liquid outward and toward the edge of the cap.

The above improvement has been practically tested and operates well. A liquid may be boiled till it is entirely evaporated without danger of its escaping over the sides of the vessel.

Having thus described my invention what I claim as new and desire to secure by Letters Patent is—

The cap B, placed within the vessel A, and constructed and arranged substantially as shown and described for the purpose set forth.

JOHN LIBLONG.

Witnesses:
WM. H. WARNER,
J. J. JACQUES.